United States Patent [19]
Pockrandt et al.

[11] Patent Number: 5,600,792
[45] Date of Patent: Feb. 4, 1997

[54] MICROPROCESSOR WITH PROTECTIVE DEVICE WHICH MAINTAINS A CLOCK SPEED OF THE CPU BELOW A THRESHOLD DURING PROGRAMMING OF EEPROM

[75] Inventors: Wolfgang Pockrandt, Reichertshausen; Heinz Schuetzeneder, Munich; Erwin Papelitzky, Pentenried, all of Germany

[73] Assignee: Siemens Aktiengesellschaft, Munich, Germany

[21] Appl. No.: 636,907

[22] Filed: Apr. 22, 1996

Related U.S. Application Data

[63] Continuation of Ser. No. 125,551, Sep. 22, 1993, abandoned.

[30] Foreign Application Priority Data

Sep. 22, 1992 [DE] Germany .................. 42 31 703.7

[51] Int. Cl.⁶ .................................................. G06F 1/08
[52] U.S. Cl. ........................................................ 375/184.01
[58] Field of Search ...................... 395/184.01; 371/61; 377/114; 361/1

[56] References Cited

U.S. PATENT DOCUMENTS

| | | | |
|---|---|---|---|
| 4,438,490 | 3/1984 | Wilder, Jr. ........................ | 364/200 |
| 4,458,308 | 7/1984 | Holtey et al. ..................... | 364/200 |
| 4,819,164 | 4/1989 | Branson ............................ | 364/200 |
| 4,875,156 | 10/1989 | Tanagawa et al. ................ | 364/200 |
| 4,910,671 | 5/1990 | Kitamura et al. ................. | 364/200 |
| 5,163,146 | 11/1992 | Antanaitis, Jr. et al. .......... | 395/550 |
| 5,199,032 | 3/1993 | Sparks et al. ..................... | 371/3 |
| 5,301,306 | 4/1994 | Plog .................................. | 395/550 |

FOREIGN PATENT DOCUMENTS

| | | |
|---|---|---|
| 3834227 | 1/1990 | Germany . |
| 4029598 | 3/1992 | Germany . |

*Primary Examiner*—Robert W. Beausoliel, Jr.
*Assistant Examiner*—Stephen C. Elmore
*Attorney, Agent, or Firm*—Herbert L. Lerner; Laurence A. Greenberg

[57] ABSTRACT

A microprocessor includes a central control unit and a memory of the EEPROM type for use in security-related systems. A protective device assures that a clock speed or frequency of the central control unit will not exceed a limit value at which reading of the memory is reliably assured, during a reading operation in the EEPROM memory.

20 Claims, 1 Drawing Sheet

MICROPROCESSOR WITH PROTECTIVE DEVICE WHICH MAINTAINS A CLOCK SPEED OF THE CPU BELOW A THRESHOLD DURING PROGRAMMING OF EEPROM

This application is a division, of application Ser. No. 08/125,551, filed Sep. 22, 1993, now abandoned

BACKGROUND OF THE INVENTION

FIELD OF THE INVENTION

The invention relates to a microprocessor having a central control unit, a memory of the EEPROM type, and a protective device which assures that during a reading operation in the EEPROM memory, the clock speed of the central control unit will not exceed a limit value at which reading of the memory is reliably assured; wherein the protective device has a clock conditioning unit with a clock input which externally inputs a microprocessor clock and which reduces the microprocessor clock by frequency division during a reading operation of the memory, so that during the reading operation a clock signal having a clock cycle being lengthened as compared with other operations is available for controlling the central control unit; and a linking device having two clock signal inputs and one clock signal output, wherein one clock signal input of the linking device is connected with the clock signal input of the microprocessor, the other clock signal input of the linking device is connected to the clock signal output of the clock conditioning unit, and the clock signal output of the linking device furnishes the clock signal for triggering the central control unit; and wherein the linking device is triggered by the central control unit in such a way that it alternatingly transmits the microprocessor clock applied to the clock signal input and the clock furnished by the clock conditioning unit, to the central control unit.

Such a microprocessor is used especially in security-related systems. That term refers to systems in which the microprocessor must be prevented from detecting a memory cell state that does not match the actual memory contents, in a reading operation of the EEPROM. It applies, for instance, to microprocessors for use in smart cards or chip cards, which are used in credit or debit systems or in entry monitoring systems or access systems.

One microprocessor of that generic type is described in German Published, Non-Prosecuted Application DE 40 29 598 A1. In that microprocessor, within a given period of time, the microprocessor clock signal applied from outside is always applied directly, for a given first time segment, and with a frequency divided by a given value, for a given second time segment, to the central control unit. The sum of the first and second time periods equals the duration of the given period of time. That assures that the mean clock speed will remain constant regardless of a reading operation actually occurring during the given period of time.

German Published, Non-Prosecuted Application DE 38 34 227 A1 also describes a microprocessor with a central control unit and a memory, in which the frequency of the clock signal supplied to the memory is converted to a desired frequency by a divider. However, in that case the frequency of the clock signal supplied to the central control unit is not changed.

The reading operation of typical semiconductor memories of the EEPROM type requires a certain minimum amount of time. Secure, unequivocal readout of the contents of typical EEPROMs can be performed, at the fastest, within a period of time that corresponds to a clock speed of the central unit or CPU doing the reading, or approximately 10 MHz. If the CPU is operated at a higher clock speed, then it always reads the same binary value out of the EEPROM, that is either ones or zeros only.

When EEPROM-type memories are used in microprocessors made by N-MOS technology, that is not a problem, because the CPU in such processors can be operated at a maximum clock speed of approximately 6 MHz, for example. Modern microprocessors, however, especially if made by CMOS technology, can be operated at a CPU clock speed of up to 30 MHz.

If a memory of the EEPROM type is used in such a processor, then the processor, given secure reading of the memory contents, cannot be operated at such a high clock speed. Yet it cannot be precluded that someone might operate such a microprocessor without authorization at a high enough clock speed or frequency that unequivocal reading of the memory content of the EEPROM by the CPU is the result.

SUMMARY OF THE INVENTION

It is accordingly an object of the invention to provide a microprocessor with a CPU and an EEPROM, which overcomes the hereinafore-mentioned disadvantages of the heretofore-known devices of this general type.

With the foregoing and other objects in view there is provided, in accordance with the invention, a microprocessor comprising a central control unit; a memory of the EEPROM type being connected to the central control unit; and a protective device being connected to the central control unit for assuring that a clock speed or frequency of the central control unit will not exceed a limit value at which reading of the memory is reliably assured, during a reading operation in the memory; the protective device having a clock conditioning unit with a clock signal output and with a clock input for receiving an externally input microprocessor clock from a clock signal input of the microprocessor, the protective device reducing the microprocessor clock by frequency division during a reading operation of the memory, so that a clock signal having a clock cycle being lengthened as compared with other operations is available during the reading operation for controlling the central control unit; the protective device having a linking device with two clock signal inputs and one clock signal output, one of the clock signal inputs of the linking device being connected to the clock signal input of the microprocessor for receiving the microprocessor clock, the other of the clock signal inputs of the linking device being connected to the clock signal output of the clock conditioning unit, and the clock signal output of the linking device furnishing a clock signal for triggering the central control unit; and the protective device having a device for frequency recognition being acted upon by the microprocessor clock from the clock signal input of the microprocessor and being connected to the clock conditioning unit for effecting a reduction in the clock speed of the clock signal intended for triggering the central control unit, the reduction being performed as a function of the clock speed of the detected microprocessor clock; and the linking device being triggered by the central control unit for causing the linking device to alternatingly supply the central control unit with the microprocessor clock applied to the clock signal input and a clock furnished by the clock conditioning unit, and the linking device being triggered for transmitting the clock furnished by the clock conditioning unit to the central control unit only during an EEPROM memory reading access.

The clock conditioning unit contained in the protection device for a microprocessor according to the invention reduces the microprocessor clock during a reading process of the EEPROM by frequency division, so that during the reading process a clock cycle that is longer than the usual clock cycle time is provided for controlling the CPU. This kind of clock conditioning unit may include a frequency divider that is triggered by an externally inputtable processor clock. A linking device with at least two inputs and one output may also be provided, wherein one of the inputs is acted upon by the externally inputtable processor clock, and the at least one input can be connected to at least one output of the frequency divider. A logic gate or a multiplexer may be used as the linking device.

A microprocessor according to the invention may also include an internal clock generator, having a clock speed which is no greater than the limit frequency at which secure reading of the EEPROM is possible, and having a clock speed which also cannot become greater, from external manipulation, than this limit frequency. In that case, the clock conditioning unit may include a switch device that typically switches an externally input processor clock to the CPU and that switches the clock furnished by the internal unit on to the CPU during a reading process in the EEPROM.

In accordance with another feature of the invention, a counter is used as the frequency divider for a clock conditioning unit according to the invention, and in particular a programmable counter is used.

In accordance with a further feature of the invention, the security device includes a device for detecting the clock speed of the externally input processor clock, and a control unit that brings about a reduction in clock speed provided for triggering the CPU, as a function of the processor clock speed being detected.

In accordance with an added feature of the invention, the security device of such a processor includes a device for detecting the clock speed intended for triggering the CPU, instead of the device for detecting the clock speed of the externally input processor clock.

In accordance with an added feature of the invention, the microprocessor according to the invention includes a protective device that lowers the clock speed of the process during a reading process in the E²PROM by a fixedly predetermined factor and increases the reduction factor for the clock speed only when a limit value of the clock speed is attained. The magnitude of the increased reduction factor for the clock speed is preferably varied as a function of the actual value of the clock speed furnished to the CPU.

In a lowering of the clock speed as mentioned above, this frequency is preferably reduced only for the particular reading cycle in the E²PROM, for instance by introducing wait states.

According to the invention, an adequate time for the actual readout process in the E²PROM always remains available regardless of the processor clock speed, because during the readout from the EEPROM, the processor clock is stopped for a certain number of cycles, through the use of a wait state circuit. Therefore, the course of commands of the microprocessor remains unchanged, even though enough time for a secure readout of the EEPROM is available. The number of wait states must be dimensioned in such a way that even at the highest clock speed at which the controller will still function, satisfactory readout is assured. If there is a general slowing of the clock speed during a reading process, this represents an unnecessary delay at low clock frequencies.

Therefore, in accordance with a concomitant feature of the invention with adapted wait states, the clock speed intended for triggering the CPU, or the processor clock speed, is evaluated. Depending on the actual clock speed value being ascertained, the number of wait states that are compelled by the wait state circuit can be increased in stages, so that satisfactory readout is always assured without limiting the usual operating speed of the microprocessor unnecessarily.

Other features which are considered as characteristic for the invention are set forth in the appended claims.

Although the invention is illustrated and described herein as embodied in a microprocessor with a CPU and an EEPROM, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
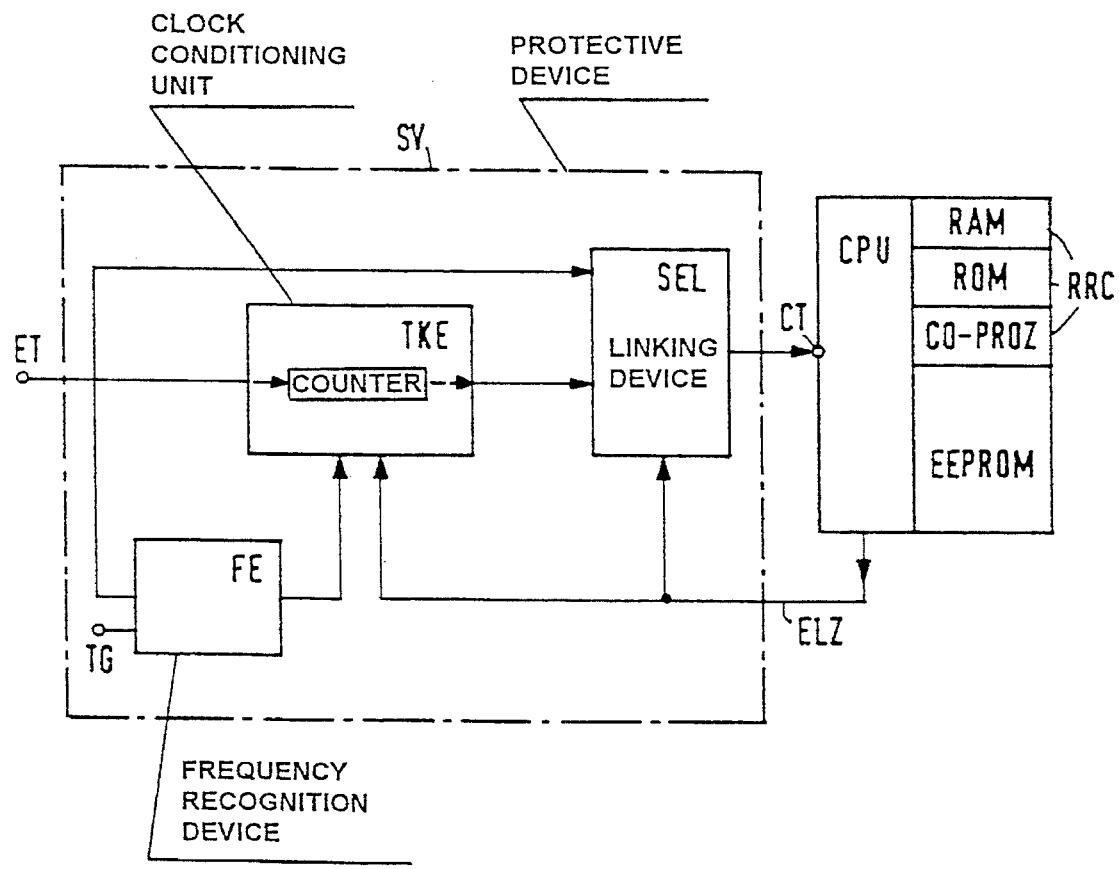
FIG. 1 is a block circuit diagram in conjunction with which the invention will be described in further detail below.

Referring now to the single figure of the drawing in detail, there is seen an embodiment of a microprocessor according to the invention, having a central control unit CPU, an EEPROM-type memory, further circuit units RRC, such as a RAM, a ROM and a coprocessor CO-PROZ, and a protective device SV. The protective device SV is connected between a microprocessor clock input ET, that can be acted upon by an external clock signal, and a clock input CT of the CPU. The protective device SV is supplied by the CPU over a signal line ELZ with a signal that indicates an EEPROM reading access. In the embodiment shown, the clock input ET is connected both to a clock conditioning unit TKE and to one input of a linking device SEL. Moreover, the clock signal input ET is interconnected to one input of a frequency recognition device FE. The frequency recognition device FE has a further input TG, which is acted upon by a frequency limit value. An output of the frequency recognition device FE is connected to one control input of the clock conditioning unit TKE and furnishes that unit with a signal which depends on the relationship between the clock speed or frequency limit value at the input TG and the microprocessor clock applied to the clock input ET. The control line ELZ from the CPU is connected to the linking device SEL and may optionally also be connected to the clock conditioning unit TKE. An output of the clock conditioning unit TKE, which carries the conditioned clock, is connected to a further clock input of the linking device SEL. The clock conditioning unit TKE, which has the task of downwardly dividing the externally input clock during a reading access to the EEPROM, preferably includes a loadable counter that carries out the frequency division. The conditioned clock to be output is thus stopped until such time as the input of a number of external clock cycles, defined by the divider ratio of the counter, has been completed. The counting or dividing operation is started by the control signal on the line ELZ. The divider ratio of the counting device of the clock conditioning unit can optionally be adjusted through the use of the output signal of the frequency recognition device FE.

The linking device SEL either switches the external clock applied to the clock input ET, or the conditioned clock furnished by the clock conditioning unit TKE, on to the CPU, as a function of the signal which is present on the line ELZ and is furnished by the central control unit CPU.

If the normal operating speed of the microprocessor is higher than the limit frequency at which secure reading of the EEPROM memory is assured in a configuration according to the invention, then during each reading operation, or in other words whenever the CPU outputs a corresponding signal on the line ELZ, it is recommended that the external clock input at the input ET be conditioned with a predetermined divider ratio, which is defined by the limit frequency of the EEPROM and by the operating frequency of the microprocessor, and that a suitably longer clock cycle signal be switched to the CPU. In order to preclude the execution of unauthorized reading operations of the EEPROM memory caused by an unauthorized further increase in the clock speed at the clock input ET, it is moreover recommended that depending on the actual clock speed input at the input ET, the divider ratio of the clock conditioning unit TKE be increased with the aid of the frequency recognition device FE. This increase can be carried out in stages, as a function of the actually ascertained clock speed value at the input ET. However, an embodiment of the invention that is especially advantageous, because it is simple to achieve, provides for the clock conditioning unit to function with only two different division factors or delay factors, namely the delay value that is described above and is intended for normal operation, and a delay factor or division factor that is defined by the ratio between the maximum clock speed limit value that can be processed by the CPU being used, and the maximum limit frequency that assures secure reading access to the EEPROM. In such a configuration, the clock conditioning unit TKE varies the length of the conditioned clock cycles that it furnishes, depending on whether or not the frequency recognition device FE at the clock speed input ET recognizes a clock that, at the low one of the two division factors of the clock conditioning unit, would lead to a conditioned clock having a speed which exceeds the allowable limit frequency for EEPROM reading accesses. In that case, the frequency recognition device FE does not need to compare the microprocessor clock speed input at the input ET with the limit frequency for secure EEPROM reading access, but rather with a limit frequency that results from the limit frequency for an EEPROM reading access and the lower division ratio or delay factor of the clock conditioning unit.

The frequency recognition device FE, with the aid of its output signal, indicates whether or not the externally input clock has exceeded a certain limit frequency. In one embodiment of the invention, the state of exceeding the limit frequency is stored in a flip-flop having a set input which is triggered through a high pass filter element. The reset input is activated through a low-pass filter once the frequency has dropped below the limit value. In such an embodiment of the invention, in order to avoid constant switching in the vicinity of the limit frequency, hysteresis can be established by means of a suitable selection of the high-pass and low-pass parameters.

We claim:
1. A microprocessor comprising: a central control unit;
an EEPROM-type memory connected to said central control unit; and
a protective device connected to said central control unit for assuring that a clock speed of said central control unit will not exceed a limit value at which reading of said memory is reliably assured, during a reading operation in said memory;
said protective device having a clock conditioning unit with a clock signal output and with a clock signal input for receiving an externally input microprocessor clock signal of the microprocessor, said protective device reducing the microprocessor clock by frequency division during a reading operation of said memory, so that a clock signal having a clock cycle being lengthened as compared with other operations is available during the reading operation for controlling said central control unit;
said protective device having a linking device with two clock signal inputs and one clock signal output, one of the two clock signal inputs of said linking device being connected to said clock signal input of the microprocessor for receiving the externally input microprocessor clock signal, another of the two clock signal inputs of said linking device being connected to the clock signal output of said clock conditioning unit, and the clock signal output of said linking device furnishing a clock signal for triggering said central control unit; and
said protective device having a device for frequency recognition being acted upon by the externally input microprocessor clock signal from said clock signal input of the microprocessor and a frequency limit value and being connected to said clock conditioning unit for effecting a reduction in the clock speed of the clock signal intended for said central control unit, the reduction being performed as a function of a relationship between the clock speed of a detected external microprocessor clock and the frequency limit value; and said linking device being triggered by said central control unit for causing said linking device to alternatingly supply said central control unit with the microprocessor clock applied to said clock signal input and a clock furnished by said clock conditioning unit, and said linking device being triggered for transmitting the clock furnished by said clock conditioning unit to said central control unit only during an EEPROM memory reading access.
2. The microprocessor according to claim 1, wherein said clock conditioning unit includes a frequency divider to which the externally input microprocessor clock is applied.
3. The microprocessor according to claim 1, wherein said linking device is a logic gate.
4. The microprocessor according to claim 2, wherein said linking device is a logic gate.
5. The microprocessor according to claim 1, wherein said linking device is a multiplexer.
6. The microprocessor according to claim 2, wherein said linking device is a multiplexer.
7. The microprocessor according to claim 2, wherein said frequency divider is a counter.
8. The microprocessor according to claim 4, wherein said frequency divider is a counter.
9. The microprocessor according to claim 6, wherein said frequency divider is a counter.
10. The microprocessor according to claim 7, wherein said counter is a settable counter.

11. The microprocessor according to claim 8, wherein said counter is a settable counter.

12. The microprocessor according to claim 9, wherein said counter is a settable.

13. The microprocessor according to claim 7, wherein said linking device has another clock signal input and a binary signal is applied to said other clock signal input of said linking device the binary signal changing its value as a function of a predetermined counter state of said counter.

14. The microprocessor according to claim 8, wherein said linking device has another clock signal input and a binary signal is applied to said other clock signal input of said linking device the binary signal changing its value as a function of a predetermined counter state of said counter.

15. The microprocessor according to claim 9, wherein said linking device has another clock signal input and a binary signal is applied to said other clock signal input of said linking device the binary signal changing its value as a function of a predetermined counter state of said counter.

16. The microprocessor according to claim 10, wherein said linking device has another clock signal input and a binary signal is applied to said other clock signal input of said linking device the binary signal changing its value as a function of a predetermined counter state of said counter.

17. The microprocessor according to claim 11, wherein said linking device has another clock signal input and a binary signal is applied to said other clock signal input of said linking device the binary signal changing its value as a function of a predetermined counter state of said counter.

18. The microprocessor according to claim 12, wherein said linking device has another clock signal input and a binary signal is applied to said other clock signal input of said linking device the binary signal changing its value as a function of a predetermined counter state of said counter.

19. The microprocessor according to claim 1, wherein during a reading operation in said memory, said protective device reduces the clock speed by a fixedly predetermined factor, regardless of an actual clock speed, and reduces the clock speed by a greater factor only if a limit value of the clock speed is attained.

20. The microprocessor according to claim 19, wherein the greater factor is variable as a function of the actual clock speed of the microprocessor, as determined by said frequency recognition device.

\* \* \* \* \*